United States Patent
Chen (10) Patent No.: US 12,391,022 B2
(45) Date of Patent: *Aug. 19, 2025

(54) COMPOSITE STRUCTURE AND METHOD OF MANUFACTURE

(71) Applicant: Graphene Composites Ltd, Sedgefield Stockton-on-Tees (GB)

(72) Inventor: Sandy Winthrop Chen, Balcombe West (GB)

(73) Assignee: GRAPHENE COMPOSITES LTD, Sedgefield Stockton-on-Tees (GB)

( * ) Notice: Subject to any disclaimer, the term of this patent is extended or adjusted under 35 U.S.C. 154(b) by 282 days.

This patent is subject to a terminal disclaimer.

(21) Appl. No.: 16/488,174

(22) PCT Filed: Feb. 22, 2018

(86) PCT No.: PCT/GB2018/050462
§ 371 (c)(1),
(2) Date: Aug. 22, 2019

(87) PCT Pub. No.: WO2018/154304
PCT Pub. Date: Aug. 30, 2018

(65) Prior Publication Data
US 2020/0061970 A1 Feb. 27, 2020

(30) Foreign Application Priority Data
Feb. 23, 2017 (GB) .................................. 1702879

(51) Int. Cl.
*B32B 9/00* (2006.01)
*B32B 9/04* (2006.01)
(Continued)

(52) U.S. Cl.
CPC .............. *B32B 9/007* (2013.01); *B32B 9/046* (2013.01); *B32B 9/047* (2013.01); *F41H 1/02* (2013.01);
(Continued)

(58) Field of Classification Search
CPC ......... B32B 9/007; B32B 9/046; B32B 9/047; B32B 2266/126; F41H 1/02; F41H 5/04
See application file for complete search history.

(56) References Cited

U.S. PATENT DOCUMENTS

| 4,843,947 A | 7/1989 | Bauer et al. |
| 5,377,577 A | 1/1995 | Bounkong et al. |

(Continued)

FOREIGN PATENT DOCUMENTS

| CN | 101839674 | 9/2010 |
| CN | 102015282 A | 4/2011 |

(Continued)

OTHER PUBLICATIONS

GB2010741.3, "Examination Report", Jun. 18, 2021, 2 pages.
(Continued)

*Primary Examiner* — Hai Vo
(74) *Attorney, Agent, or Firm* — Kilpatrick Townsend & Stockton LLP (57) ABSTRACT

A composite structure comprises a plurality of first layers each comprising graphene; and a plurality of second layers each comprising an aerogel, wherein the first and second layers alternate in the composite structure. A method for manufacturing a composite structure comprising first and second layers comprises providing a plurality of the second layers, each second layer comprising an aerogel, providing a plurality of first layers, each layer comprising graphene;
(Continued)

and arranging the first and second layers so that the layers form a composite structure in which the plurality of first and second layers alternate.

10 Claims, 7 Drawing Sheets

(51) Int. Cl.
*F41H 1/02* (2006.01)
*F41H 5/04* (2006.01)

(52) U.S. Cl.
CPC .......... *F41H 5/04* (2013.01); *B32B 2255/102* (2013.01); *B32B 2255/20* (2013.01); *B32B 2266/06* (2013.01); *B32B 2266/102* (2016.11); *B32B 2266/126* (2016.11); *B32B 2307/202* (2013.01); *B32B 2307/304* (2013.01); *B32B 2307/558* (2013.01); *B32B 2571/02* (2013.01)

(56) References Cited

U.S. PATENT DOCUMENTS

| | | | |
|---|---|---|---|
| 11,635,280 | B2* | 4/2023 | Chen .................. F41H 5/0492 89/36.02 |
| 2004/0132845 | A1 | 7/2004 | Rhine |
| 2005/0085146 | A1 | 4/2005 | Farkas et al. |
| 2012/0128983 | A1 | 5/2012 | Yoon et al. |
| 2012/0189782 | A1* | 7/2012 | Zafiropoulos ..... H01L 21/02126 427/535 |
| 2013/0215551 | A1 | 8/2013 | Bowers et al. |
| 2014/0127490 | A1 | 5/2014 | Islam |
| 2014/0208932 | A1 | 7/2014 | Lee et al. |
| 2014/0240921 | A1 | 8/2014 | Sultenfuss et al. |
| 2014/0260937 | A1 | 9/2014 | Whitaker |
| 2014/0287641 | A1* | 9/2014 | Steiner, III ............ F41H 5/0471 428/317.1 |
| 2015/0065613 | A1 | 3/2015 | Balijepalli et al. |
| 2015/0198380 | A1 | 7/2015 | Haj-Hariri et al. |
| 2015/0218730 | A1 | 8/2015 | Dang |
| 2015/0260329 | A1 | 9/2015 | Bond et al. |
| 2016/0200882 | A1* | 7/2016 | Bhat ......................... F41H 1/02 442/327 |
| 2016/0221303 | A1 | 8/2016 | Jancar et al. |
| 2016/0265857 | A1 | 9/2016 | Benthem |
| 2016/0276056 | A1* | 9/2016 | Stolyarov .............. C09D 11/38 |
| 2017/0003104 | A1* | 1/2017 | Andresen ............ A41D 31/285 |
| 2017/0028674 | A1* | 2/2017 | Wadley ................ C01B 32/184 |
| 2017/0218141 | A1* | 8/2017 | Nosker ................. C01B 32/182 |
| 2017/0307339 | A1 | 10/2017 | Bahu |
| 2018/0022061 | A1 | 1/2018 | Kotake et al. |
| 2018/0073841 | A1 | 3/2018 | Dekort et al. |
| 2018/0304598 | A1 | 10/2018 | Drzal et al. |
| 2020/0061970 | A1 | 2/2020 | Chen |
| 2021/0078309 | A1* | 3/2021 | Chen ....................... B32B 27/08 |
| 2022/0081808 | A1* | 3/2022 | Craig .................. D03D 1/0052 |

FOREIGN PATENT DOCUMENTS

| | | |
|---|---|---|
| CN | 105555519 A | 4/2016 |
| CN | 104848748 | 8/2016 |
| CN | 106626676 A | 5/2017 |
| CN | 107097478 A | 8/2017 |
| CN | 107142037 A | 9/2017 |
| CN | 206575941 U | 10/2017 |
| CN | 107365497 A | 11/2017 |
| CN | 107513168 A | 12/2017 |
| GB | 2463454 | 3/2010 |
| GB | 2559979 | 8/2018 |
| KR | 2013-0034473 A | 4/2013 |
| KR | 2014-0039493 A | 4/2014 |
| WO | 2004-018919 A2 | 3/2004 |
| WO | 2006-009921 A2 | 1/2006 |
| WO | 2011-024011 A1 | 3/2011 |
| WO | 2012-138803 A2 | 10/2012 |
| WO | 2013-148843 A2 | 10/2013 |
| WO | 2014-011108 A1 | 1/2014 |
| WO | 2014/197082 A2 | 12/2014 |
| WO | 2015160822 | 10/2015 |
| WO | 2016015467 A1 | 2/2016 |
| WO | 2016-167714 A1 | 10/2016 |
| WO | 2017-017628 A1 | 2/2017 |
| WO | 2017-123522 A1 | 7/2017 |

OTHER PUBLICATIONS

GB2016940.5 , "Examination Report", May 12, 2021, 2 pages.
U.S. Appl. No. 17/056,246 , Non-Final Office Action, Mailed On Dec. 22, 2021, 10 pages.
U.S. Appl. No. 17/056,246 , "Restriction Requirement", Sep. 24, 2021, 5 pages.
Application No. CN201880013754.7 , Office Action, Mailed On Jun. 28, 2022, 17 pages.
Application No. CN201980027668.6 , Office Action, Mailed On Apr. 14, 2022, 16 pages.
PCT/GB2021/051508 , "Invitation to Pay Additional Fees and, Where Applicable, Protest Fee and Communication relating to the results of the partial International Search", Sep. 23, 2021, 15 pages.
CN 201980027668.8; Second Office Action; dated Oct. 24, 2022; 9 pages.
CN 201980027668.6; Third Office Action; dated Jun. 6, 2023; 9 pages.
CN 201980027031.7; Office Action; dated Apr. 25, 2022; 7 pages.
CN 201980027031.7; Second Office Action; dated Dec. 15, 2022; 3 pages.
PCT/GB2019/050488; International Search Report and Written Opinion; Apr. 10, 2019; 14 pages.
U.S. Appl. No. 17/056,246; Non-Final Office Action; dated Sep. 8, 2022; 8 pages.
U.S. Appl. No. 16/971,885; Non-Final Office Action; dated Sep. 9, 2022; 20 pages.
U.S. Appl. No. 16/971,885; Final Office Action; dated Mar. 22, 2023; 17 pages.
U.S. Appl. No. 16/971,8885, "Non Final Office Action", Mar. 8, 2024, 20 pages.
U.S. Appl. No. 16/971,832, "Non Final Office Action", Jan. 31, 2024, 18 pages.

* cited by examiner

COMPOSITE STRUCTURE AND METHOD OF MANUFACTURE

CROSS-REFERENCE TO RELATED APPLICATIONS

This application is the U.S. National Stage Entry under 35 U.S.C. § 371 of Patent Cooperation Treaty Application No. PCT/GB2018/050462, filed Feb. 22, 2018, which claims the benefit of GB Application No. 1702879, filed Feb. 23, 2017, which is incorporated herein by reference as if fully set forth.

FIELD OF INVENTION

The present invention relates to a composite structure and a method of making a composite structure.

BACKGROUND TO THE INVENTION

Composite materials are used in a variety of applications across numerous different industries, including aerospace industries, ballistic protection, construction, vehicles, amongst others. Composites are used as the combination of different materials having different properties can lead to composite structures with significantly improved performance and which mitigate the drawbacks of some of the materials present in the composite. For example, fibre-glass is a common composite used in many different industries, which is formed of a mixture of a polymer matrix and glass fibres. The addition of the glass fibres helps to avoid some of the failure modes of unreinforced polymer materials.

While existing composites provide a great deal of advantageous properties, there is continuous demand for improvements and increased performance.

For example, articles such as bullet-proof or stab-proof vests or armour plating (e.g. on vehicles) which are designed to protect a wearer or an object surrounded by the articles from an impact (e.g. from a projectile or blunt force) or from penetration (e.g. from a sharp object or bullet) often have certain drawbacks. Typical materials used in body armour include carbon-based fibres, such as para aramid fibres, glass laminates, some polymers and/or metals or alloys, but often an amount of these materials that provides sufficient protection results in a heavy of cumbersome article. Thus, it would be advantageous to provide an article can be worn without impairing the wearing or without dissuading the wearer from wearing the article or armour that does not slow a vehicle considerable and/or reduce manoeuvrability.

Similarly, while commonly used composites in aircraft manufacture and vehicle design are lightweight and relatively strong, many can suffer from draw backs such as being brittle, providing little protection against impacts or providing no thermal insulation. Therefore, it would be advantageous if composite materials could provide other improved properties as well as the strength required for these materials.

More generally, there are a great deal of applications for versatile and strong composites. Therefore, it would be advantageous to provide composites that could be readily used and incorporated into various processes and articles.

SUMMARY OF THE INVENTION

In a first aspect of the invention, there is provided a composite structure comprising a plurality of first layers each comprising graphene; and a plurality of second layers each comprising an aerogel. The first and second layers alternate in the composite structure.

In other words, there is provided a composite or laminate structure comprising alternating layers of graphene or materials containing graphene and aerogel or other nano-porous materials. The invention in this aspect can provide a composite with very advantageous properties including a combination of strength, low weight, resilience, high electrical conductivity through the graphene layers and good heat or electrical insulation in particular directions.

Aerogels are a class of highly porous (typically nano-porous) solid materials with a very low density and which are very strong relative to their weight, making them useful in composites. As explained in more detail below, aerogels are formed by creating a gel and subsequently drying the gel to remove the liquid component (e.g. using supercritical drying). This creates the unique structure which contributes to the advantageous properties, including low density, high ability to transfer and dissipate impact forces and high electrical and heat insulating properties.

Graphene layer is a two-dimensional allotrope of carbon with a single layer of graphene includes a single planar sheet of sp2-hybridized carbon atoms. Graphene is known for its exceptionally high intrinsic strength, arising from this two-dimensional (2D) hexagonal lattice of covalently-bonded carbon atoms. Further, graphene also displays a number of other advantageous properties including high conductivity in the plane of the layer.

It is the combination of these two materials that leads to the advantageous properties of the composite.

For example, embodiments of the invention in this aspect provide a composite structure that can be used as a high-strength/ultra-light membrane, skin or layer on an aircraft or vehicle. The composite structure provides a material with the strength required for these uses, but without the drawbacks of existing materials, since the composites are not brittle and provide excellent thermal insulation. Moreover, the composites are able to absorb significant impacts compared to prior art composites and are significantly lighter (typically similar protection can be provided at 5 to 20% of the weight of a comparable prior art carbon fibre composite. This is in addition to the other standard properties expected from a composite used in these fields, including good vibrational damping (especially compared to carbon fibre composites) and low coefficients of thermal expansion. In embodiments, flexible composite structures according to embodiments of the first aspect could replace pre-impregnated composite fibre tapes ("pre-preg tape), which is used in numerous ways in these industries, and which has drawbacks (including that it has to be cured and is brittle).

Further embodiments of the invention in this aspect provide a composite structure that can be used to protect a person or object by absorbing an impact (e.g. from a projectile, weapon or collision) and/or preventing penetration through the structure. Embodiments of the composite structure achieve this by absorbing the impact and providing a protective structure that resists penetration through the particular combination of layers and the use of an aerogel layer, as explained in more detail below. For example, the combination of the aerogel layer and the graphene layer is advantageous, as the graphene layer provides a high-tensile layer (i.e. the tensile strength of the first layer (graphene-based) is stronger than that of the second layer (aerogel-based)) which serves as a barrier to penetration and at least partly reduces the force while the aerogel can absorb a substantial portion of the impact. The composite structure in embodiments can form part of a ballistic resistant article, such as a worn article (e.g. projectile resistant body armour) or as a protective layer on a vehicle or building, or can form part of a penetration resistance article, for example as stab-resistance body armour. As a result of the use of this structure, embodiments provide stab and bullet resistant structures at significantly less weight compared to prior art composite structures offering comparable protection.

Embodiments of the invention also provide a composite structure that can be used in a component in an electrical or electronic device, for example as an electricity conducting member (e.g. a wire or cable). Advantageously such embodiments will provide excellent conductivity by virtue of the graphene layer, particularly where the graphene extends across the entire layer between electrical terminals (or is intermixed with another conducting component), which are also relatively strong and damage resistant by virtue of the use of graphene and an aerogel layer. Graphene layers have been found to be highly conductive such that they provide excellent conduction properties and modified graphene layers (including Holey Graphene) have shown improved ion mobility. Thus, strong and resilient composites with graphene layers, as disclosed herein, act as excellent components for electrical devices.

As mentioned above, aerogels are a class of highly porous (typically nano-porous) solid materials with a very low density. More particularly, an aerogel is an open-celled structure with a porosity of at least 50% (but preferably with a porosity of at least 95% air (e.g. 95 to 99.99%), optionally at least 99%) produced by forming a gel in solution and subsequently removing the liquid component of the gel using supercritical heating. As a result of the drying conditions, the solid portion of the gel maintains its structure as the liquid component is removed, thereby creating the porous body. The pores of an aerogel will typically have a pore size in the range of 0.1 to 100 nm, typically less than 20 nm. In embodiments, however, the aerogel can have a pore size in the range of 0.1 to 1000 nm, optionally 0.1 to 900 nm; 10 to 900 nm; 20 to 900 nm; 20 to 500 nm; or 20 to 100 nm. In embodiments, the porosity and pore size distributions of the aerogels can be measured using nitrogen absorption at 77K and applying the Brunauer, Emmit and Teller (BET) equation (see "Reporting Physisorption Data for Gas/Solid Systems" in Pure and Applied Chemistry, volume 57, page 603, (1985)). An aerogel can be formed from a number of materials, including silica, organic polymers (including polyimide, polystyrenes, polyurethanes, polyacrylates, epoxies), biologically-occuring polymers (e.g. gelatin, pectin), carbon (including carbon nanotubes), some metal oxides (e.g. iron or tin oxide), and some metals (e.g. copper or gold). In some embodiments, the aerogel is a cross-linked aerogel (e.g. the aerogel is formed from a cross-linked polymer, e.g. a cross-linked polyimide). Such aerogels are advantageously flexible and strong.

Aerogels offer increased impact absorbing properties as they offer a much broader cone of force dispersion than the components of prior art composites and thus impact forces can be dispersed much more quickly and widely. This is at least in part due to the ability of these layers to spread impacts out in the plane of the layer, as well as through the height of the layer. In particular, the "nano-auxetic" structure of aerogels can provide them with shock-absorbing properties—the nanometre-sized tree-branch-like atomic structures spread the force of an impact along those branches, thereby rapidly dissipating the force of an impact.

These layers are particularly advantageous when used together as the high-tensile strength of the graphene-containing layer helps to hold the composite together, while also providing the other benefits mentioned herein, and the nano-auxetic aerogel layer helps to disperse any impact forces, thus lessening the direct in-line force that is transmitted to the next graphene layer, and so forth. Without the graphene layer, there would also be greater tendency for a projectile or impact to penetrate through the aerogel without dispersing sufficient force. Together, these enable the composite structure to disperse force to a greater extent than using these layers on their own. This also means that the composite is much more durable than if these components were used on their own.

The composite structure comprises a number of layers. Each consecutive layer may be directly or indirectly in contact with the other layers of the composite structure. For example, the composite structure may further comprise additional layers provided between a first layer and a second layer. The composite structure may also comprise additional layers provided on top (e.g. on the upper surface of the uppermost layer) or bottom (e.g. on the lower surface of the lowermost layer) of the composite structure. Each layer may fully cover a surface of an adjacent layer or may only partially cover the surface of an adjacent layer. In some embodiments, a layer may extend beyond the edge of an adjacent layer. The layers may also each include further components or additives. For example, in some embodiments the graphene layer may comprise a polymer (e.g. polyurethane). In the composite structure, the layers may each have a thin sheet structure—i.e. with two larger opposing faces connected by four smaller edges.

In an embodiment, each first layer is bonded to an adjacent second layer. In other words, each graphene layer is bonded to an adjacent aerogel layer. This can be directly (i.e. with direct contact between the graphene layer and the aerogel layer and bonded provided by the adhesive nature of either of the first or second layer) or indirectly (with another component, for example an adhesive or another layer, provided between the graphene layer and the adjacent aerogel layer). This is advantageous as this has been found to improve ballistic performance. By adjacent second layer, it is meant one of the second layers on either side of the first layer (i.e. next to the first layer). In some embodiments, the structure is orientated with an upper graphene layer being bonded to a lower aerogel layer. In some embodiments, each first layer is directly bonded to an adjacent second layer such that the graphene layer is provided on an adjacent aerogel layer. In some embodiments, all of the layers of the composite are bonded together. In other words, (all of) the first and second layers are bonded together, as well as any other layers present in the composite. Thus, a first layer may be bonded to the two adjacent second layers, and vice versa. When bonded together in a multi-layered sandwich, the resulting composite has both high strength and extreme lightness, as a result of the high aggregate strength. Accordingly, in some embodiments there is a composite formed of alternating layers of graphene and nano-porous materials (aerogels), wherein bonding is provided between the graphene and aerogel layers.

In another embodiment, a fastening element or means is provided to secure the first and second layers of the composite structure together, the fastening element or means being provided along an edge of the composite structure. By 'provided along the edge' it is meant that the fastening element or means (e.g. stitching or staples) are provides adjacent and along the edges of the composite structure (from a top-down view) and extend through the layers to secure the layers together. The fastening element constrains the edges of the composite. It has been found that this can dramatically improve the performance of composite and the same level of penetration-resistance (e.g. stab) and/or ballistic performance can be achieved with fewer layers. In another embodiment, a fastening element or means is provided to secure the layers of the composite structure together, the fastening element or means being provided along an edge of the composite structure.

In an embodiment, the composite structure comprises between 2 and 250 first layers and/or 2 and 250 second layers. In an embodiment, the composite comprises at least 5 layers, at least 10 layers or, in some embodiments, at least 25 layers. For example, there may be 10 to 200 layers, 25 to 150 layers, 50 to 125 layers. The number of first layers may be the same as the number of second layers. In some embodiments, the number of first layers is at least 5, at least 10 or, in some embodiments, at least 25. For example, there may be 10 to 100 layers or 25 to 50 first layers. It has been found that an increased number of layers can lead to a projectile being stopped earlier in the composite than in cases where there are fewer layers. This may be as a result of a shear thickening effect.

In another embodiment, at least one of the first layers consists essentially of graphene. In a further embodiment, each (all) of the first layers consist essentially of graphene. The term "consists essentially of . . . " means that the first layer is almost entirely formed from graphene, but may contain minor quantities of other materials (for example, as a result of contamination or as a result of the method of forming the graphene layer). For example, it may be formed from 95% or greater graphene (by weight or by volume), preferably 98% or greater, more preferably 99% or greater or even more preferably 99.9% or greater graphene.

In an embodiment, at least one of the first layers is a planar layer of graphene, which in embodiments extends in a plane parallel to a plane defined by an adjacent second layer. In other words, the graphene is formed as a planar layer along and parallel to a surface of an adjacent second layer. This is advantageous as the alignment of the graphene layer on the aerogel means that an impact coming in a direction perpendicular to the plane of the graphene will have to overcome the graphene in its strongest direction, and subsequently will impact the aerogel in a direction in which it can readily dissipate the force in the plane of the layer. Thus, these embodiments are particularly effective at absorbing an impact provided in a direction substantially perpendicular to the plane of the graphene layer. In an embodiment, each of the first layers is a planar layer of graphene extending in a plane parallel to a plane defined by an adjacent second layer. In an embodiment, each of the first layers is a mono-layer, a bi-layer or a tri-layer of graphene. In other words, the first layer comprises 1 atomic layer of graphene, 2 atomic layers or 3 atomic layer of graphene. Advantageously, the impact resistance of two or three atomic layers of graphene is significantly greater than a single atomic layer of graphene. In some embodiments, the first layer comprises at least 1 atomic layer of graphene, at least 5 atomic layers, at least 10 atomic layers of graphene. Preferably, in some embodiments, the first layer comprises from 1 atomic layer of graphene to 10 atomic layers of graphene. Both impact resistance and electrical conductivity have been observed to deteriorate with more layers, and by circa 10 layers the performance begins to decrease.

In an embodiment, at least one of the first layers comprises graphene in the form of graphene platelets or powder. The graphene platelets may be in the form of pure graphene platelets or as graphene platelets in a matrix. In some cases, the graphene may be functionalised to improve compatibility with a solvent in the manufacturing process, for example by functionalising using plasma treatment. For example, in some embodiments graphene may be functionalised using carboxyl groups. One example is a plasma treatment of "oxygen" functionalisation using the Hydale HDLPAS process, which is set out in WO 2010/142953 A1. The graphene platelets can have an average particle size (i.e. a number average particle size) in the lateral dimension (i.e. at the greatest width across the face of the platelet) of at least 1 µm, optionally at least 2 µm, at least 5 µm (e.g. 1 to 10 µm, or 1 to 5 µm). Number average thickness of the platelets can be less than 200 nm, e.g. less than 100 nm, less than 50 nm. These measurements can all be measured by SEM. The platelets can comprise single or multiple layers of graphene.

In some embodiments, graphene is provided in each of the first layers (independently or all of the layers) in an amount of at least 0.1 wt %, at least 1 wt %, at least 2 wt %, at least 5 wt %, at least 10 wt %, at least 50 wt %, at least 80 wt % or at least 95 wt %. For example, the graphene content may be between 0.1 wt % and 99 wt %, 1 wt % and 80 wt %, 2 wt % and 50 wt %.

The graphene (e.g. in platelet form) may be provided in a matrix, such as a polymer matrix. Thus, in some embodiments, the first layer further comprises a polymer. Embodiments can be advantageous as these provide a matrix for the graphene, which can aid manufacture and other properties, such as resilience of the graphene layer. The polymer may also provide resilience for the aerogel layer and it has been found that polymer layers used in conjunction with aerogel layers improves the effectiveness of the composite structure by helping to hold the structure together and dispersing forces acting upon the structure. This is particularly effective for the polymer layers located in front of the aerogel layer (relative to the direction of a force acting upon the structure, e.g. an impact). Thus, in some embodiments, the first layer comprising the polymer is provided as an upper layer, with a second layer below or behind the layer. In some embodiments, there may be a plurality of different polymers and/or the polymer may be a copolymer. The polymer can result in the first layer acting as a binding layer adapted to hold together the structure of an adjacent aerogel layer. The polymer may be a single polymer or may be a polymer blend. The polymer can have a number average molecular weight of at least 1,000 Da; for example, at least 10,000 Da (e.g. 10,000 Da to 100,000 Da). In an embodiment, the polymer is selected from polyurethane, polyethylene (including ultra-high molecular weight polyethylene), polypropylene, polyester, polyamide, polyimide, epoxy resin or combinations thereof. In some embodiments, the polymer comprises polyurethane and/or an epoxy resin (e.g. a thermosetting network polymer formed from an epoxy resin with a hardener). Polyurethanes are particularly advantageous as the structure comprises rigid sections (based around the isocyanate groups) and soft flexible regions (around the diol groups), which make it suited to providing impact protection while remaining flexible. Other components can also be present. Use of a cross-linked polymer is particularly advantageous as this encourages dissipation of a force across the entire polymer layer.

Methods of incorporating the graphene into a polymer or other matrix can include the use of mill rolling, such as dispersion using a three-roll mill. This can allow for dispersion of the graphene without the need for solvents and in a relatively high-throughput manner.

In an embodiment, each first layer independently has a thickness of from 0.34 nm to 20 µm. This can include a thickness of from 1 nm to 10 µm, 10 nm to 5 µm, 10 nm to 1 µm or 20 nm to 100 nm. In some embodiments, the first layers all have substantially the same thickness. In an embodiment, each second layer independently has a thickness of 20 µm to 1000 µm. For example, this can include a thickness of from 50 µm to 800 µm, 100 µm to 500 µm or 125 µm to 250 µm. In some embodiments, the second layers all have substantially the same thickness.

In an embodiment, at least one of the second layers is a polyimide aerogel. In a further embodiment, each (all) of the second layers is a polyimide aerogel. Polyimide aerogels have been found to be particularly effective in such a composite structure as they have some flexibility while also having a relatively high-tensile strength compared to other aerogels. Furthermore, polyimide-based aerogels also form less dust than silicon-based aerogels, reducing the likelihood of inhaling any aerogel-derived dust. Polyimide-based aerogels also recover from impacts/compressions better than silicon-based aerogels—a key performance criteria for impact protection and providing improved multi-hit protection.

In another embodiment, the composite further includes a protective or ballistic layer. Thus, the composite comprises at least a second type of high-tensile layer, in addition to the graphene-layers. By protective or ballistic layer, it is means that the layer has a higher tensile strength than the second layer and optionally than first layer and as such provides a high-tensile layer (for example, the layer may have a tensile strength of at least 200 MPa, at least 500 MPa, at least 1000 MPa; for example, 250 MPa to 5000 MPa; 1000 MPa to 5000 MPa). This can be measured, for example, by ASTM D7269 where the protective layer is a fibre-based layer and ASTM D3039 for polymer matrix based materials. The protective layer absorbs a portion of the impact and assists in preventing penetration through the structure together with the graphene layers, with the aerogel layers acting as impact absorbing layers, so as to reduce the force transferred through the structure. Thus, the combination of the graphene layer, aerogel layer and the protective layer is advantageous, as the protective layer provides a high-tensile layer which serves as a barrier to penetration and at least partly reduces the initial force of the impact before the backing structure can absorb a substantial portion of (or the remainder of) the impact. This reduces the likelihood of failure of aerogel layer under the initial peak force and thereby reduces the likelihood that that the aerogel will fracture. In turn, this allows the aerogel to absorb more of the impact and thereby provide better protection. Such embodiments provide a composite structure that is particularly effective at protecting a person or object from an impact or penetration (e.g. from a projectile, weapon or collision) and embodiments provide stab and bullet resistant structures at significantly less weight compared to prior art composite structures offering comparable protection.

In an embodiment, the protective layer comprises a metal, an alloy, a polymer and/or a carbon containing material, preferably a polymer and/or a carbon-containing material. For example, the protective layer may comprise a high-tensile polymer and/or carbon fibre containing material. In a further embodiment, the protective layer comprises a high-tensile material selected from the group consisting of aramid (aromatic polyamide) fibres, aromatic polyamide fibres, boron fibres, ultra-high molecular weight polyethylene (e.g. fibre or sheets), poly(p-phenylene-2,6-benzobisoxazole) (PBO) or combinations thereof. For example, in one embodiment, the protective layer is a UHMWPE textile with a weight of between 100 and 200 gsm, optionally between 140 and 180 gsm. Where fibres are used, the layer can comprise a binder, such as an epoxy resin. In an embodiment, the protective layer has a thickness of 50 µm to 500 µm, optionally 125 µm to 250 µm. In embodiments where there are a plurality of protective layers, each protective layer has a thickness of 50 µm to 500 µm, optionally 125 µm to 250 µm.

In an embodiment, the protective layer is provided as an upper layer and the alternating first and second layers are provided below the protective layer. Thus, the protective layer acts a cover layer and can be arranged as the first layer of the composite to receive the impact of an article or projectile. In embodiments where the composite is used in embodiments in which it is susceptible to damage (e.g. as an outer casing on a vehicle or as a penetration/ballistic resistant armour), this is particularly advantageous as the protective layer can absorb some of the initial force of any impact and resist penetration. As the protective layer deforms and/or moves under the force of the impact, the remaining structure comprising alternating graphene and aerogel layers behind the protective layer being to absorb a portion of the force of the impact.

In some embodiments, the composite further includes a plurality of protective or ballistic layers. In embodiments, these can alternate with the first and second layers, such that the composite has a structure of alternating first, second and protective layers. The number of protective layers may be the same as the number of first and second layers. In some embodiments, the number of protective layers is at least 3 layers, optionally at least 10 layers or, in some embodiments, at least 25 layers.

In an embodiment, the first layer is a flexible first layer and/or the second layer is a flexible second layer. Depending on the particular formulation and/or fabrication process, each of the layers can be made so as to be flexible and/or resilient such they can at least partially deform under without fracturing. For example, the first layer may comprise graphene and a flexible/resilient polymer (e.g. an elastomeric polymer) and/or the second layer may comprise a flexible aerogel (e.g. a cross-linked aerogel, for example polyimide aerogel).

In a second aspect of the invention, there is provided an article comprising the composite structure of any of the abovementioned embodiments. The article can be a wearable article.

In a third aspect, there is provided a method of making or manufacturing a composite structure comprising first and second layers. The method comprises providing a plurality of the second layers, each second layer comprising an aerogel, providing a plurality of first layers, each layer comprising graphene; and arranging the first and second layers so that the layers form a composite structure in which the plurality of first and second layers alternate. In an embodiment, the composite structure is a composite structure of any of the embodiments of the first aspect of the invention.

In an embodiment, providing a plurality of first layers comprises mixing a graphene powder with a solvent or carrier to form an ink; applying the ink to a substrate; and removing the solvent or carrier to leave a first layer comprising graphene on the substrate. Thus, the plurality of layers may be produced by repeating this process to create several layers or by apportioning or separating the layer into a plurality of layers (e.g. by cutting the first layer or first layer and substrate). By ink it is meant a suspension of graphene powder (e.g. graphene in powder or particular form, including graphene platelets) in a liquid medium or a solution comprising graphene. These embodiments provide an efficient and relatively low cost method for providing a relatively uniform and dense layer of graphene.

In some embodiments, the substrate may be a second layer comprising an aerogel (i.e. an aerogel layer). In such cases, the graphene may accordingly be deposited on a surface of the aerogel. Moreover, where the aerogel is used as a substrate, the layers can be built directly onto the aerogel, thereby reducing the total number of steps involved in the method. If the substrate is not a second layer, then the method may further comprise removing the first layer from the substrate or transferring the first layer to another substrate. Alternatively, the substrate may form part of the composite structure.

In another embodiment, providing a plurality of first layers comprises providing a source of graphene and a substrate; and using the source of graphene and a thin-film deposition method to provide a first layer on the substrate. Thus, the plurality of layers may be produced by repeating this process to create several layers or by apportioning or separating the layer into a plurality of layers (e.g. by cutting the first layer or first layer and substrate). A source of graphene can include a graphene precursor, for example a source of carbon, In embodiments, thin-film deposition includes chemical deposition, such as atomic layer disposition and other chemical vapour deposition, physical vapour deposition (e.g. nano-sputtering). In some embodiments, the substrate may be a second layer comprising an aerogel (i.e. an aerogel layer). In such cases, the graphene may accordingly be deposited on a surface of the aerogel. Moreover, where the aerogel is used as a substrate, the layers can be built directly onto the aerogel, thereby reducing the total number of steps involved in the method. If the substrate is not a second layer, then the method may further comprise removing the first layer from the substrate or transferring the first layer to another substrate. Alternatively, the substrate may form part of the composite structure.

In another embodiment, providing a plurality of first layers comprises slot die coating graphene onto a substrate or the aerogel. This may require the graphene to be in a matrix or solvent.

BRIEF DESCRIPTION OF THE DRAWINGS

An example of the invention will now be described with reference to the accompanying figures, in which.

Like components are given like reference numerals. For example, a graphene layer may be referred to as "$102a$", "$102b$" or "$202a$".

DETAILED DESCRIPTION

Figure 1:
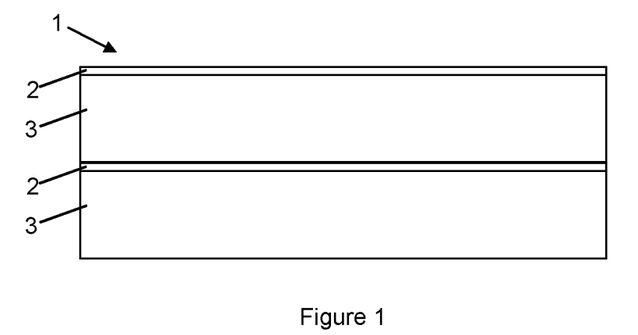
FIG. 1 shows a first embodiment of a composite structure according to the invention from a side view.

A first embodiment of the invention is shown in FIG. 1 in the form of a composite structure 1. The composite structure 1 comprises two graphene layers 2 and two aerogel layers 3. In this embodiment, the layers are arranged so that each aerogel layer 5 is provided behind the graphene layers 2, which are applied directly to the upper surface of the adjacent (in this case, lower) aerogel layers 3. In use, the composite structure 1 can be used as a very lightweight structure in an article, such as body armour, to prevent impact or penetration or as a component in an aircraft or vehicle. The composite structure 1 can be arranged in an article with the graphene layer 2 forming the outermost layer (i.e. towards the direction from which the force is expected). In the case of body armour, the composite structure 1 would be arranged with the graphene layer 2 directed away from the body and with the aerogel layer 3 being the layer closest to the body of the wearer. In the case of an impact, such as a projectile impact (e.g. a bullet hitting the body armour), the graphene layer 2 is the first layer the projectile comes into contact with. A similar arrangement would be used in a vehicle or aircraft.

By way of example, in one embodiment, the graphene layer 2 of the composite structure 1 is a multi-layer graphene structure having a thickness of approximately 10 nm. The aerogel layer 3 in this embodiment is a 100 micrometre thick layer of a flexible silicon aerogel. The aerogel layer 3 has voids or bubbles within the structure with an average diameter of 50 nm. The composite structure 1 is constructed by using atomic layer deposition to provide a layer of graphene on a flexible silicon aerogel substrate, followed by layering of multiple silicon aerogel substrates with graphene disposed thereon to form a composite structure 1. Although aerogels have a highly porous structure, due to methods of manufacture, some have a matte face comprising a substantially sealed and flat surface (compared to the other faces which tend to be dominated by the open pore structure) and, therefore, it can be advantageous to use this sealed flat surface as the substrate for applying the graphene layer by atomic layer deposition (this is also true of other methods of application of graphene layer, e.g. ink based application).

Figure 2:
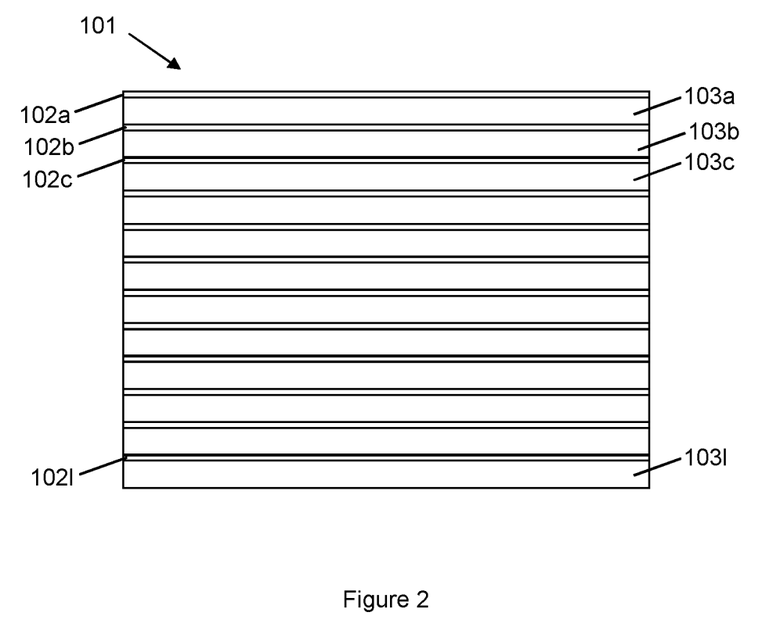
FIG. 2 shows another embodiment of a composite structure according to the invention from a side view.

A further embodiment of the invention is shown in FIG. 2, where a composite structure 101 comprises a plurality of graphene layers 102a, 102b, 102c, 102l and a plurality of aerogel layers 103a, 103b, 103c, 103l. The graphene layers 102a-c,l and the aerogel layers 103a-c,l alternative such that the composite structure 101 has a repeating structure of graphene layer/aerogel structure/graphene layer/aerogel layer. In this way, there is an outermost graphene layer 102a, behind which is an aerogel layer 103a. This structure then repeats such that there is a second graphene layer 102b behind the first aerogel layer 103a, which is adjacent a second aerogel layer 103b, followed by a third set of layers 102c, 103c, which repeat until a final graphene layer 102l and a final aerogel layer 103l. Although not visible in FIG. 2, the layers 102a-c,l 103a-c,l of the structure 101 are bonded together by means of an adhesive which is provided between the layers.

In this embodiment, the composite structure 101 is provided by forming a number of layers of aerogel substrate with graphene formed thereon and layering these into the composite structure 101. In this case, the graphene is disposed onto the aerogel substrate using the graphene in the form of an ink. This is achieved by dispersing graphene platelets in a solvent, applying the ink to the surface of the aerogel and removing the solvent to leave a layer of graphene platelets on the surface. This allows for the simple and relatively inexpensive application of a layer of graphene to the aerogel. Moreover, no further additives are required in the layer (e.g. a matrix).

The presence of numerous layers of graphene and aerogel in repeating fashion in the composite structure 101 has been found to provide a particularly strong, yet still flexible, composite. Accordingly, the structure 101 is particularly useful for preventing penetration and absorbing impact as the presence of multiple discrete structures means that a failure of one aerogel layer (e.g. a fracture or breach) or protective layer will not necessarily result in failure of the structure, since there are other layers to absorb an impact. Further, a further effect has been observed whereby an increase in the number of layers leads to an increase in the effectiveness of the earlier layers in the structure. Thus, the composite 101 can be used as a material for situations where damage from impacts needs to be avoided (e.g. the outer skin of aircraft or vehicles, or as a protective armour). Given the repeating structure of aerogel/graphene layers, the particular orientation of the composite is not critical to its performance; however, it can be advantageous to have the composite structure 101 of FIG. 2 orientated in an article with the outermost protective graphene layer 102a facing outwardly, towards the direction of expected impact (i.e. the direction from which an impact is most likely to occur). In this way, each of the aerogel layers 103a-c,l in the structure have an adjacent corresponding graphene layer 102a-c,l provided in front of them (i.e. in the direction of impact).

With existing prior art graphene/carbon fibre composites and/or aluminium, the strength of the article primarily comes from the cumulative tensile strength of the materials involved. Thus, the thicker the aluminium/titanium/carbon fibre composite skin, the stronger it is. Embodiments of the invention, including for example that of FIG. 2, provide advantages over these prior art composites because the thin graphene layer (and, where present, graphene-containing polymer layer) provides tensile strength, whilst the thicker, but extremely light aerogel layer provides force dispersion and vibration dampening—thus reducing the strain on the layer below it. When bonded together in a multi-layered sandwich, the resulting composite has both high strength and extreme lightness.

Figure 3:
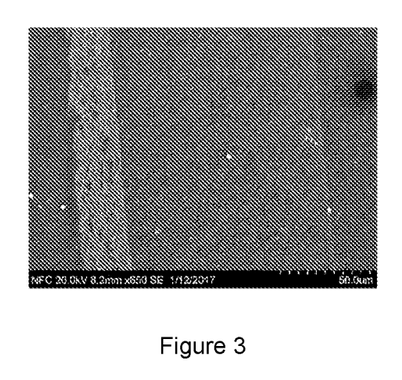
FIG. 3 shows an SEM image of an aerogel layer with a graphene layer disposed thereon at 650× magnification.
Figure 4:
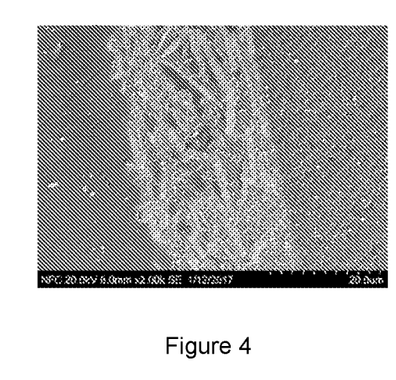
FIG. 4 shows an SEM image of an aerogel layer with a graphene layer disposed thereon at 2000× magnification.

As set out above, the graphene layer can comprise a layer of graphene platelets, which in some embodiments is provided directly on the aerogel layer. FIGS. 3 and 4 show SEM images of a single layer of graphene platelets on a single layer of aerogel at 650× and 2000× magnification. Here the structure of the graphene platelets can be clearly seen. Using the methods disclosed herein a dense layer of graphene can be formed on the aerogel providing a strong, resilient cover or protective layer.

Figure 5:
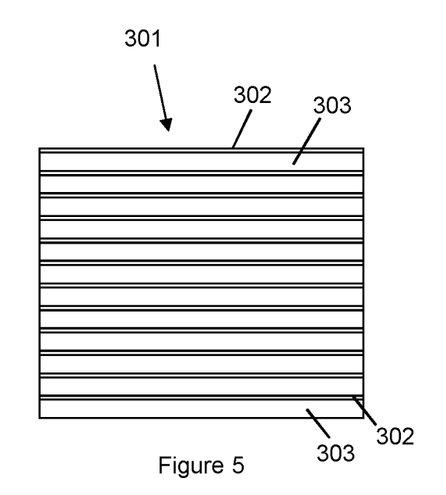
FIG. 5 shows another embodiment of a composite structure according to the invention from a side view.

A further embodiment is shown in FIG. 5, in which there is a composite structure 301 comprising alternating graphene 302 and aerogel 303 layers. In this embodiment, the graphene layer 302 is a layer of graphene platelets dispersed in a polymer matrix, with the graphene-doped polymer being directly laminated onto the aerogel layer 303.

A specific embodiment of the composite 301 of FIG. 5 comprises a 20 micrometre thick layer of polyurethane doped with 5 wt % of graphene platelets and the aerogel used in the aerogel layer 5 is a 125 micrometre thick layer of polyimide aerogel.

In combination with a polymer-containing graphene layer, the aerogel layer becomes more effective in preventing damage caused by an impact or penetration. The polymer contained in the graphene layer can help to maintain the structure of aerogel during an impact event (e.g. preventing or reducing the risk of cracking and holding any fragments of aerogel together). For example, the polymer layer can hold the aerogel layer together as it is deformed and collapsed under the force of the impact. This allows the aerogel layer to continue to resist a force against it or resist subsequent forces (e.g. a multi-hit impact event) and retain its high tensile properties to a greater degree. As a result of its location, the polymer layer advantageously holds together the forward face of the aerogel layer (i.e. the face directed towards the impact), which is subject to the greatest force and is at risk of disintegration or separation. The polymer layer itself may also provide some impact resistance and disperse impact efficiently along the graphene layer. Furthermore, a polymer can be used to help optimise the properties of the graphene layer for a specific use. For example, certain polymers will make the composite more flexible.

Figure 6:
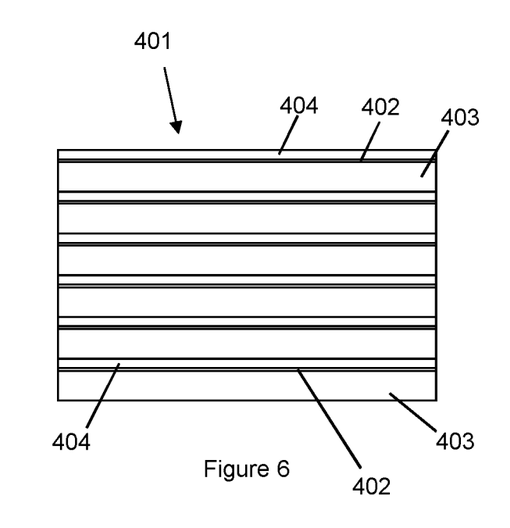
FIG. 6 shows another embodiment of a composite structure according to the invention from a side view.

A further embodiment is shown in FIG. 6. In this embodiment, the composite 401 includes alternating aerogel 403 and graphene 402 layers, but also includes a further set of protective layers 404 which are intermediate each pair of an aerogel 403 and a graphene 402 layer. Thus, the composite 401 has a repeating pattern of protective layer 404/graphene layer 402/aerogel layer 402. The protective layer 404 is a ballistic or penetration resistant high-tensile layer which provided on the top of the composite 401 and is located forward (i.e. in the direction of incoming impact force) of each of the graphene 402 and aerogel layers 402. The protective layer absorbs a portion of the impact and assists in preventing penetration through the structure.

In a specific embodiment of the composite 401, the protective layer 404 of the composite structure 401 is an ultra-high molecular weight polyethylene (UHMWPE) layer having a thickness of 180 micrometres. The graphene layer 402 in this embodiment is a 20 micrometre thick layer of graphene platelets and the aerogel used in the aerogel layer 5 is a 125 micrometre thick layer of polyimide aerogel.

Figure 7:
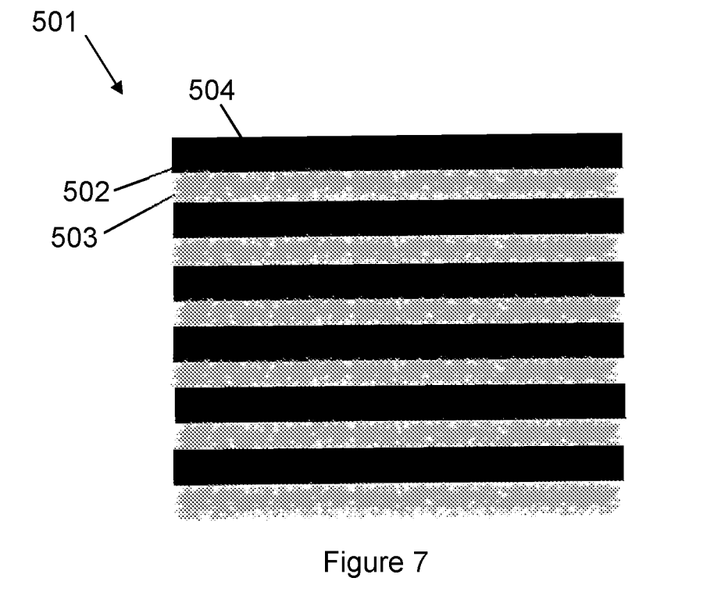
FIG. 7 shows another embodiment of a composite structure according to the invention from a side view prior to an impact from an object.

In an embodiment shown in FIG. 7, a composite structure 501 comprises a plurality of protective layers 504, a plurality of graphene layers 502, and a plurality of aerogel layers 503. The protective layers 504, the graphene layers 502 and the aerogel layers 503 repeat through the structure 501 such that the graphene layers 502 and aerogel layers 503 alternate, with a protective layer 504 between each alternating pair of graphene/aerogel layers 502, 503.

Figure 8:
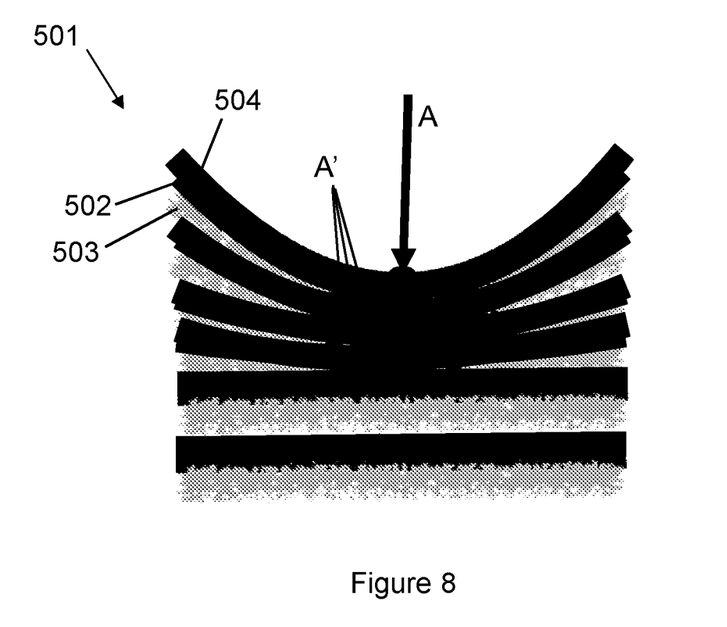
FIG. 8 shows the embodiment of FIG. 7 from a side view after impact from an object.

FIG. 7 shows the composite structure 501 prior to impact by a force, where the layers are in an initial stacked structure. FIG. 8 shows the composite structure 501 in use, where the top of the structure 501 has been impacted by a projectile in a direction perpendicular to the surface of the layers. As can be seen in this Figure, the force of the impact (designated as arrows A in FIG. 8), causes the deformation of the layers of the composite structure 501, starting with the uppermost protective layer 504, and followed by the remaining layers depending on the magnitude of the force A. As the force impacts the upper layers, these layers deform and the force begins to be dissipated by these layers (see arrows A'). One of the major mechanisms for this absorption of force is the deformation of the aerogel (which is essentially compressed by the force of the impact) and penetration is resisted by the high-tensile properties of the graphene 502 and protective layers 504. As the force continues, other adjacent layers in the structure 501 will begin to deform thereby further disappoint the force. Eventually, the projectile or source of the force will be stopped thereby preventing penetration and reducing or completely avoiding the transfer of force to the object or person protected by the composite structure 501.

Figure 9A:
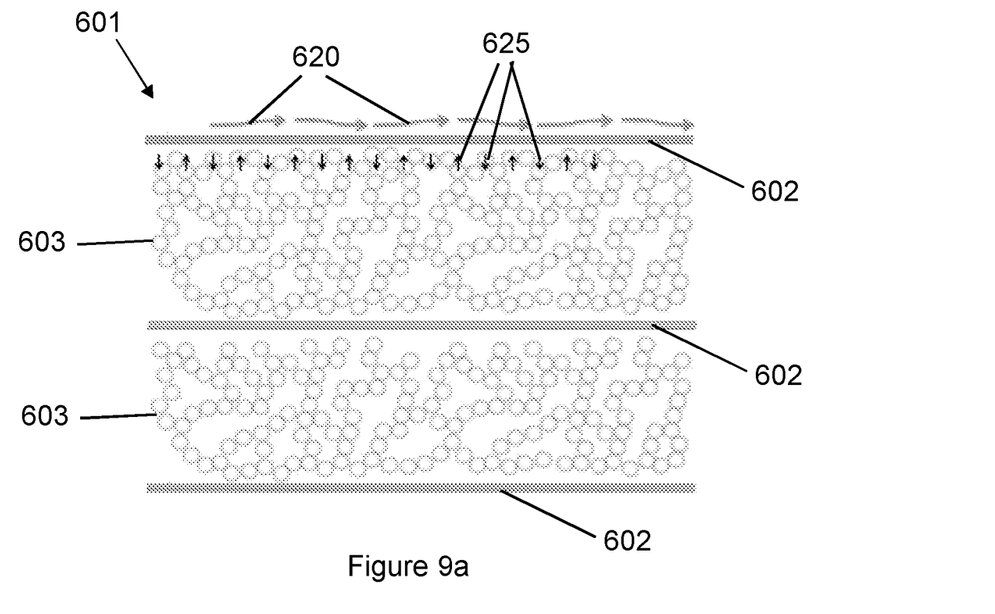
FIG. 9a shows another embodiment of a composite structure according to the invention from a side view.

A further embodiment is shown in FIG. 9a, in which there is a composite structure 601 comprising alternating graphene 602 and aerogel 603 layers. In this embodiment, the graphene layer 602 is formed of multiple layers of graphene to form a single layer 603, which is then directly bonded onto the aerogel layer 603. Each of the aerogel layers 603 is directly bonded to the immediately adjacent graphene layer 603 such that the composite 601 provides a unitary structure. This embodiment is particularly advantageous when used as an outer skin for vehicles, such as aircraft. FIG. 9a shows how the composite 601 deals with the vibrations caused by airflow 620 across its surface. Vibrations (depicted by arrows 625) are dampened and absorbed by the aerogel layers 603 in the structure so as to minimise vibration through the structure, with the graphene layers 602 and aerogel layers 603 acting together to prevent damage.

Figure 9B:
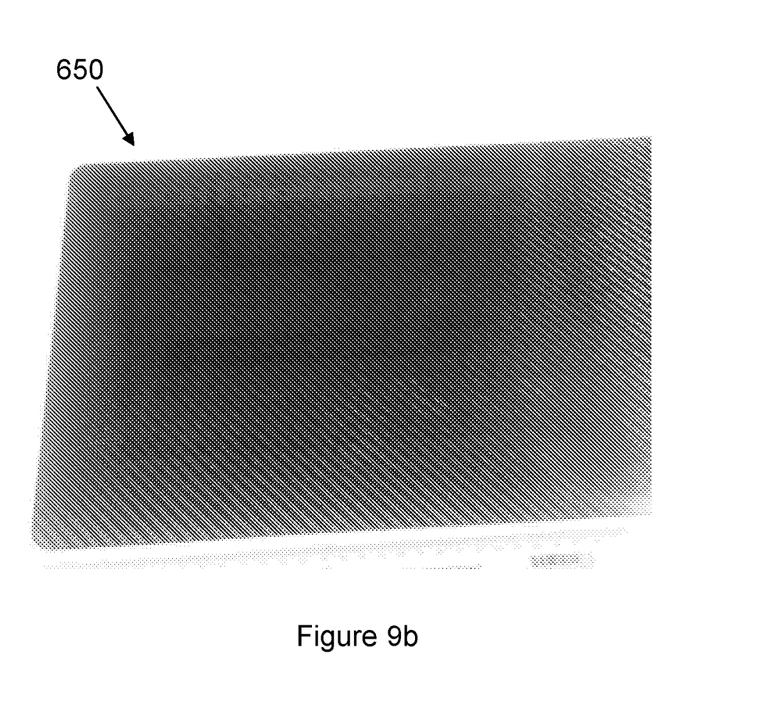
FIG. 9b shows another embodiment of a composite structure according to the invention from a side perspective view.

An example of an aircraft skin 650 is shown in FIG. 9b. This contains a composite having a similar structure to that of FIG. 9a.

Figure 10:
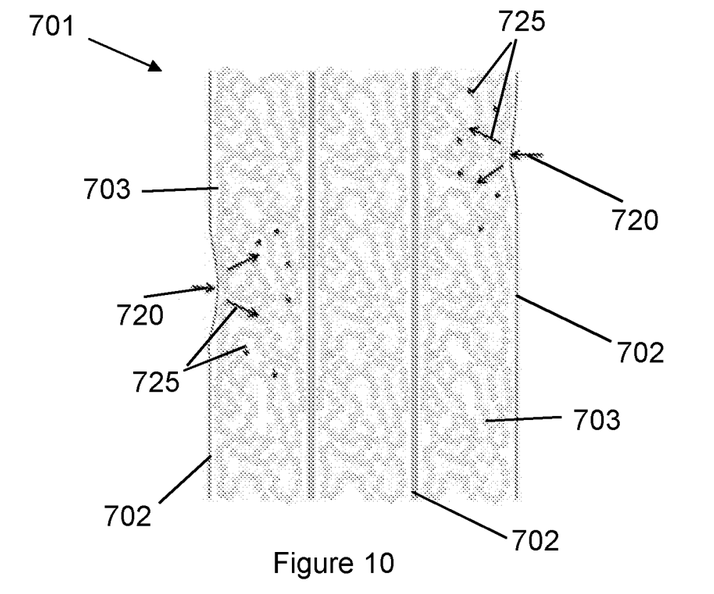
FIG. 10 shows another embodiment of a composite structure according to the invention from a side view.

A further embodiment is shown in FIG. 10. In this embodiment, there is a composite structure 701 shown which is for use in a cable or tape (only a portion of the structure is shown). The structure 701 comprises a number of aerogel layers 703 which alternate with graphene layers 702. This structure 701 provides a useful backbone for a cable or tape as the aerogel and graphene present in the first 702 and second 703 layers provides the strength and resilience required to function where significant sheer forces 720 (dissipated in the structure 701 by the mechanisms depicted by arrows 725) will be acting on the elongate designs.

Figure 12A:
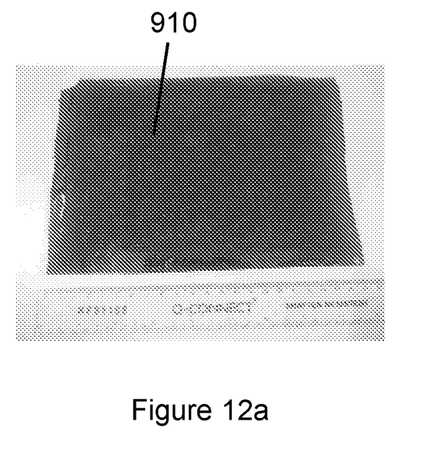
FIG. 12a shows a single sheet of a graphene and aerogel composite.
Figure 12B:
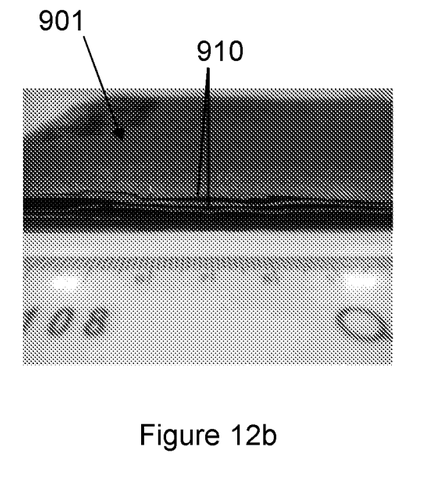
FIG. 12b shows an embodiment of a composite structure according to the invention from a side view.

For exemplary purposes, FIG. 12a shows a single structure 910 (not in accordance with the invention) comprised of a graphene layer formed on an aerogel layer. This single structure 910 is bonded together 10 other single structures 910 to form a composite structure 901 in accordance with the embodiment, as shown in FIG. 12b.

Figure 13A:
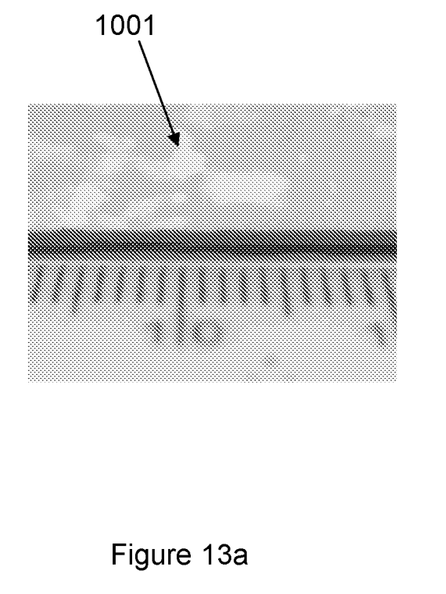
FIGS. 13a and 13b show another embodiment of a composite structure according to the invention from side and side perspective views, respectively.
Figure 13B:
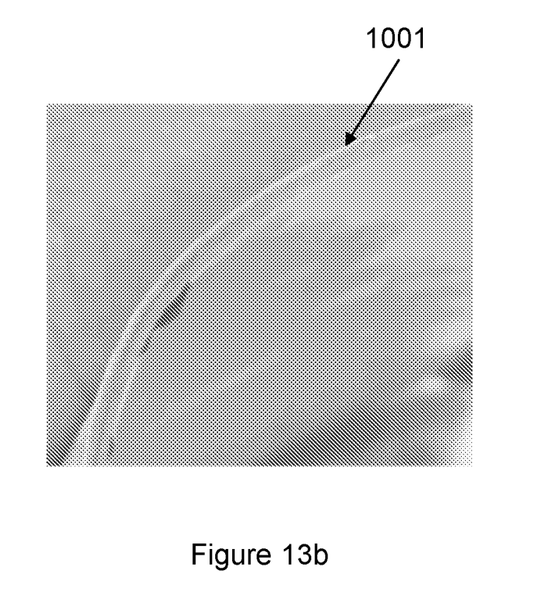

A further composite structure 1001 is also shown in FIG. 13a, where a plurality of graphene layers are provided on a corresponding polyimide aerogel layers to form a graphene/aerogel/graphene/aerogel repeating pattern with the layers bonded together. As can be seen in FIG. 13b, the composite structure 1001 is flexible due to the flexibility of the graphene and aerogel layers.

As set out above, manufacturing the above laminates can be carried out by a number of methods. For example, where the graphene is a planar layer, the graphene may be deposited using a thin-film deposition method or, alternatively, by using an exfoliation technique.

In one embodiment, a roll-to-roll manufacturing process is used. In particular, a flexible aerogel layer (for example, a cross-linked aerogel) is provided on a flexible substrate (e.g. a polymeric substrate film) and a graphene layer is formed on the aerogel using a thin film deposition method.

In another embodiment, graphene can be formed using an epitaxial formation of graphene on a flexible metal substrate, which can then be layered with a flexible aerogel. Thus, graphene can be grown on a metal (e.g. ruthenium) and placed on aerogel, before these are removed from the substrate and used to construct a composite structure comprising multiple layers of graphene and aerogel.

In another embodiment, the graphene layer may be formed as an ink which is used to coat an aerogel layer or film. In this way, the graphene, in the form of platelets or a powder, for example, can be readily applied to a number of substrates in a relatively straightforward manufacturing process. The other components making up the ink may remain in the graphene layer or may be removed after the layer has been applied.

EXAMPLES

Specific examples of composite structures that are provided below:

Example 1

A 125 µm flexible polyimide aerogel layer (AeroZero 125 micrometer polyimide aerogel film; BlueShift Inc (US)) was cut to size and coated with a 20 µm layer of graphene (Elicarb graphene powder; Thomas Swan & Co Ltd UK Product No. PR0953) in a polyurethane matrix (PX30; Xencast UK Flexible Series PU Resin system. Manufacturer reported properties: Hardness of 30-35 (Shore A); Tensile strength 0.7-1.2 MPa; Elongation 100-155% at break; Tear Strength 3.5-3.8 kN/m) using a slot die process. After coating, the graphene/polyurethane layer was left to cure and subsequently cut to size.

The graphene/polyurethane layer comprised 5 wt % functionalised graphene (Elicarb graphene powder; Thomas Swan & Co Ltd UK Product No. PR0953), which was dispersed in the polyurethane prior to slot die processing. More specifically, prior to dispersion, the graphene was treated with a plasma treatment of "oxygen" functionalisation using the Hydale HDLPAS process, which is set out in WO 2010/142953 A1 (alternatively, plasma functionalised graphene nanoplatelets are commercially available from Hydale "HDPLAS GNP" e.g. HDPlas GNP-$O_2$ or HDPLAS GNP—COOH). Following treatment, the graphene and polyurethane are premixed in a planetary centrifugal mixer and the resin was degassed under vacuum to remove air bubbles. The mixture was then passed through a dispersion stage using a Three Roll mill (at 40° C. with a <5 µm gap) and with eight passes. The graphene/polyurethane mixture was then mixed with a hardener, followed by subsequent degassing using a planetary centrifugal mixer.

Once the graphene/polyurethane mixture was created it was layered down onto a polypropylene sheet with a 20 µm drawdown wire rod (which regulates the thickness to 20 µm). After the layering down has been completed, the layer was left to dry out. However, before the graphene/polyurethane layer fully cures, the aerogel is stuck onto the layer so as to bond the layers together. The combined layers making up the structure were then left to cure for 24 hours, and after which the combined layer of aerogel and the polyurethane/graphene resin mixture was cut into shape.

An ultra-high molecular weight polyethylene (UHMWPE) fabric (Spectra 1000; 200D; Honeywell; 80 gsm; Warp Yarn 24 Tex; Weft Yarn 25 Tex; Encs×Picks/10 cm 177×177; Plain Weave) was cut to the same size as the backing structure and was applied to the upper surface of the backing structure (i.e. the exposed surface of the polyurethane layer).

The composite structure was then further built up by adding additional, alternating layers of the graphene layers and aerogel layers, together with UHMWPE fabric between each pair of graphene and aerogel layers to form a multi-layered composite. This process was repeated to provide a multi-layered composite comprising 90 layers comprising 30 aerogel layers, 30 graphene/polyurethane layers and 30 UHMWPE layers with the repeating structure: UHMWPE/graphene layer/aerogel layer. The layers of the composite were bonded together.

This composite structure was both flexible and lightweight and therefore can be incorporated into body armour. The composite structure also provided effective protection against damage from a knife impact by absorbing the force of the impact and preventing penetration of the knife through the composite structure.

Example 2

Using the techniques described in respect of Example 1, above, a composite structure comprising 26 layers of UHMWPE fibre (DOYENTRONTEX Bulletproof unidirectional sheet; WB-674; 160 g/m$^2$; 0.21 mm thickness) alternating with 25 layers of backing structure was prepared. The backing structure comprised 125 μm flexible polyimide aerogel (AeroZero 125 micrometer film from BlueShift Inc (US)) layered with a 20 μm layer of a polyurethane (PX60; Xencast UK) (i.e. 25 layers of aerogel alternating with 25 layers of polyurethane). In this Example, the polyurethane was infused with 0.2% graphene (Elicarb graphene powder; Thomas Swan & Co Ltd UK Product No. PR0953) using the technique set out in respect of Example 2. Thus, the composite had the following repeating pattern arrangement of layers " . . . UHMWPE layer/polyurethane+graphene layer/aerogel layer/UHMWPE layer/polyurethane+graphene layer/aerogel layer . . . ".

Example 3

Using the techniques described in respect of Example 1, above, a composite structure comprising 26 layers of UHMWPE fabric (Spectra 1000; 200D; Honeywell; 80 gsm; Warp Yarn 24 Tex; Weft Yarn 25 Tex; Encs×Picks/10 cm 177×177; Plain Weave), 25 layers of 125 μm flexible polyimide aerogel (AeroZero 125 micrometer film from BlueShift Inc (US)) and 25 layers of a 20 μm layer of a polyurethane (PX60; Xencast UK) doped with 1% graphene (Elicarb graphene powder; Thomas Swan & Co Ltd UK Product No. PR0953). Thus, the laminate had the following repeating pattern arrangement of layers " . . . UHMWPE layer/polyurethane+graphene layer/aerogel layer/ UHMWPE layer/polyurethane+graphene layer/aerogel layer . . . ".

Example 4

Figure 14A:
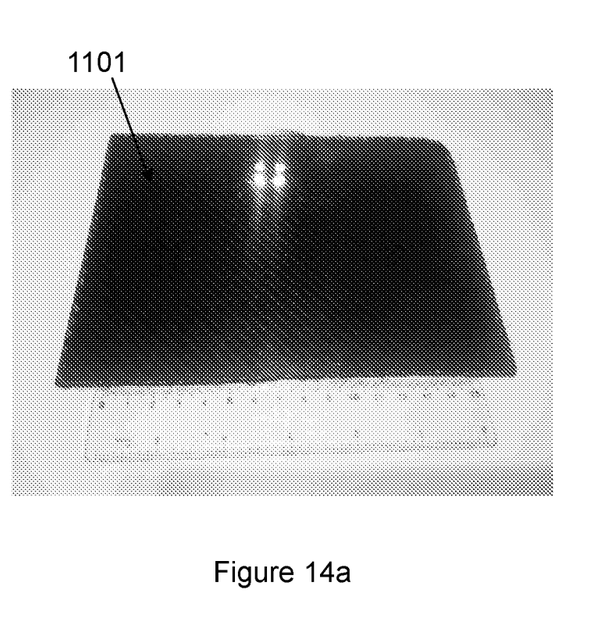
FIGS. 14a and 14b show another embodiment of a composite structure according to the invention from a top perspective view and a bottom perspective view, respectively.
Figure 14B:
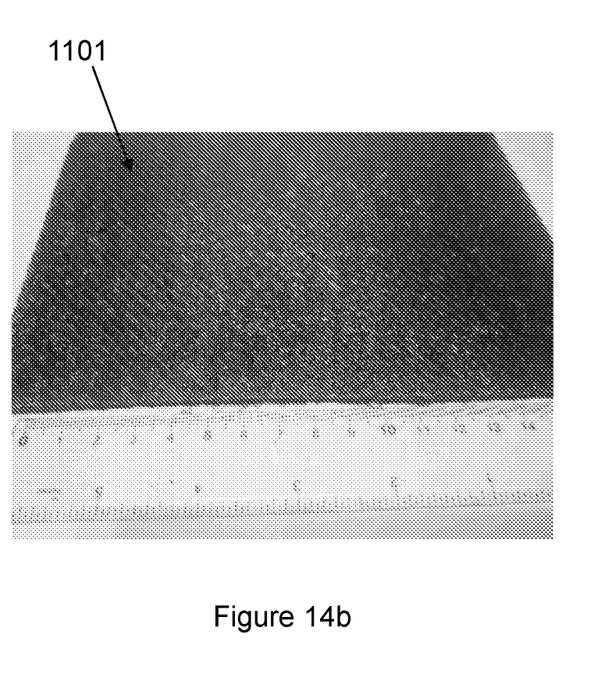

A composite structure 1101 is shown in FIGS. 14a (top view) and 14b (underside view). The composite structure 1101 comprises a repeating structure comprising an aerogel film (125 μm flexible polyimide aerogel; AeroZero 125 micrometer film from BlueShift Inc (US)), a graphene particle infused epoxy (Elicarb graphene powder; Thomas Swan & Co Ltd UK Product No. PR0953) and a high-tensile polyoxymethylene (POM) layer (Delrin). Thus, the composite structure 1101 has a sub-unit of aerogel/graphene-infused epoxy/POM which repeats throughout the structure to form a composite having alternating graphene and aerogel containing layers.

The composite structure 1101 is manufactured by firstly functionalising the graphene nanoplatelets in a Haydale plasma reactor (using a carboxyl process) and subsequently dispersing the graphene nanoplatelets in a flexible epoxy. The graphene/epoxy mixture was subsequently slot die coated onto the Aerogel film and then layered with the POM layer (in the form of a fabric). This sub-unit is then vacuum-cured at room temperature. The structure was then built up by bonding multiple sub-units together on top of one another to form the composite structure 1101. In this way, an aerogel layer of one sub-unit was bonded to a POM layer of an adjacent sub-unit. Furthermore, the lowermost sub-unit of the composite structure 1101 was provided with a POM layer on its underside so that POM layers form the uppermost and lowermost layers.

The composite structure 1101 was flexible, strong and light and thus provides an excellent composite for use in aerospace and/or vehicle skin applications. The composite structure 1101 shown (dimensions 143 mm×193 mm) had a weight of 61 g, whereas a comparative example of similarly-sized (with the exception of thickness) carbon-fibre aerospace composite having similar properties weighed 514 g. The comparative carbon-fibre aerospace composite panel was 4× thicker than the prototype panel; however, even scaling the composite structure 1101, the comparable weight of the composite structure would have been 244 g, or less than half the weight of the carbon fibre aerospace composite, with improved properties.

Comparative Example 1

An existing commercially available laminate structure widely used in stab-resistance worn articles was selected as a comparison for the embodiments described above. The comparative example comprises a laminate structure comprising: 12 layers of Kevlar fabric/finely stitched felt/a layer of chainmail/finely stitched felt/12 layers of Kevlar fabric. The laminate structures of Examples 1 and 2 were tested together with the comparative Example.

Comparative Example 2

It was apparent through observations and testing that a significant portion of the force of any impact in the structure of Comparative Example 1 was being dispersed in the plane of the layers by the chainmail layer and so the laminate structure of Comparative Example 1 was also tested with the chainmail removed. Thus, Comparative Example 2 consists of a laminate structure comprising 12 layers of Kevlar fabric/finely stitched felt/12 layers of Kevlar fabric.

Testing

Penetration Resistance Testing

Figure 11:
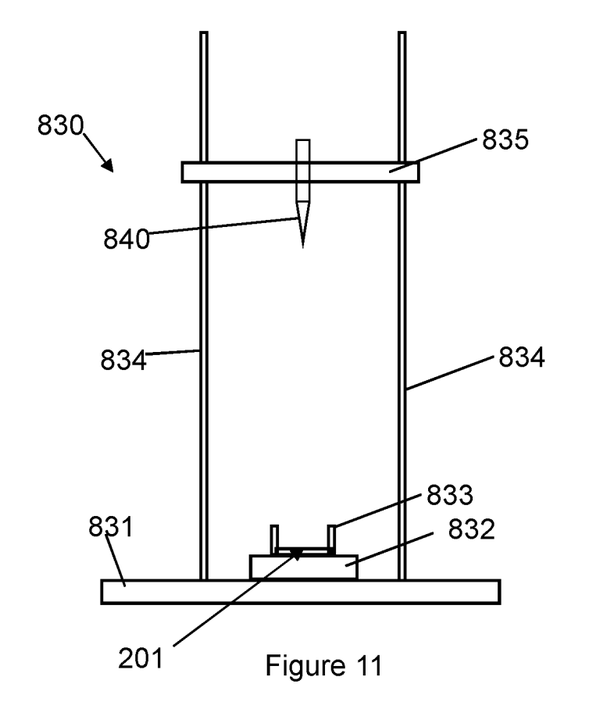
FIG. 11 shows a front view of a test rig.

Testing was carried out using a test rig 620, which is depicted in FIG. 11. The test rig 830 comprises a base 831 on which is provided a jig 832 with clamps 833 for mounting a sample (shown as laminate structure 201 in FIG. 11) thereon. The test rig 830 also comprises a weighted sled 835, to which a knife 840 is attached. The test rig 830 is arranged with the weighted sled 835 and knife 840 suspended above the sample, with the blade of the knife 840 facing the sample (i.e. downwards). The sled 835 and knife 840 can then be dropped and travel along vertical guide rails 834 (using a series of linear bearings (not shown) to minimise friction) until the knife 840 impacts the sample. In the test referred to hereinbelow, the test rig used a Home Office Science Development Branch (HOSDB) P1/B Test blade supplied from High Speed and Carbide Limited. In some of the tests, the jig 832 and clamps 833 were not used to restrain the sample used (referred to as "free standing").

The depth of penetration of the blade into each structure is shown below in Table 1:

TABLE 1

| Sample | Jig | Depth Penetration (mm) |
|---|---|---|
| Example 2 | Jig Constrained | 2-6 |
| Comparative Example 1 | Free standing (no jig constraint) | 2-3 |
| Comparative Example 1 | Jig Constrained | 2-3 |
| Comparative Example 2 | Free standing (no jig constraint) | 39-41 |

Table 1 demonstrates that the laminate structures in accordance with an embodiment of the invention provide very high penetration resistance and perform at least as well as the laminate structures used in existing stab-proof vests which include a metal chainmail layer and significantly better than the laminate structures where the metal chainmail layer is removed. Thus, these laminate structures can be used in articles without requiring chainmail or heavy metal plate layers, thereby providing significant advantages. Furthermore, the specific results for Example 2 also show significant protection afforded by a laminate structure with less layers and a thinner structure.

Ballistic Testing

Ballistic testing of Example 7 was carried out. The tests involved firing a .22 Long Rifle bullet at point-blank range. The composite structure of Example 7 was able to stop the .22LR rifle bullet. Examination of the sample after the test showed that the bullets were stopped and held in the composite around the $17^{th}$ layer of UHMWPE and backing structure. Thus, the laminate structures provide effective ballistic protection.

Although the invention has been described with reference to specific embodiments and examples above, it will be appreciated that modifications can be made to the embodiments and examples without departing from the invention.

The invention claimed is:

1. A protective armor article comprising a composite structure, the composite structure comprising:
    a plurality of graphene layers; and
    a plurality of aerogel layers;
    wherein the graphene layer and the aerogel layer are directly bonded in an alternating structure;
    wherein at least one of the graphene layers comprises graphene in the form of graphene platelets and the graphene platelets are dispersed in a polymer matrix;
    wherein the polymer matrix comprises a polymer selected from polyurethane, polyethylene, polypropylene, polyester, polyamide, polyimide, epoxy resin or combinations thereof;
    a protective layer, wherein the protective layer is provided as an exterior layer to the alternating graphene and aerogel layers and comprises one or more of aromatic polyamide fibres, boron fibres, ultra-high molecular weight polyethylene, and poly (p-phenylene-2,6-benzobisoxazole) (PBO), including combinations thereof;
    wherein a fastening element is provided to secure the graphene layers and aerogel layers together when the composite structure is positioned in the protective armor article; and
    wherein the graphene is provided in each of the graphene layers in an amount of from 0.1 wt % to 5 wt % graphene and wherein the polymer is provided in each of the graphene layers in an amount of from 95 wt % to 99.9 wt %.

2. The protective armor article of claim 1, wherein the composite structure comprises between 2 and 250 graphene layers and/or 2 and 250 aerogel layers.

3. The protective armor article of claim 1, wherein each graphene layer independently has a thickness of from 0.34 nm to 20 μm.

4. The protective armor article of claim 1, wherein each aerogel layer independently has a thickness of 20 μm to 1000 μm.

5. The protective armor article of claim 1, wherein at least one of the aerogel layers is a polyimide aerogel.

6. An article to be worn by a user, the article comprising the protective armor article of claim 1.

7. The protective armor article of claim 1, wherein the polymer of the polymer matrix is polyurethane.

8. The protective armor article of claim 1, wherein the polymer of the polymer matrix is a cross-linked polymer.

9. The protective armor article of claim 1, wherein the aerogel comprises a polyimide; and wherein the polymer of the polymer matrix is polyurethane.

10. The protective armor article of claim 1, wherein the fastening element is provided around an edge of the composite structure.

* * * * *